US 8,204,682 B2

(12) United States Patent
Hatami

(10) Patent No.: US 8,204,682 B2
(45) Date of Patent: Jun. 19, 2012

(54) ARRIVAL MONITORING WITH DIRECT AND ACTUAL TRAVEL PATH REPORTING

(76) Inventor: Naquib U. Hatami, Bristow, VA (US)

( * ) Notice: Subject to any disclaimer, the term of this patent is extended or adjusted under 35 U.S.C. 154(b) by 475 days.

(21) Appl. No.: 12/487,022

(22) Filed: Jun. 18, 2009

(65) Prior Publication Data
US 2010/0323722 A1 Dec. 23, 2010

(51) Int. Cl.
G01C 21/34 (2006.01)
G06F 19/00 (2006.01)

(52) U.S. Cl. ........ 701/412; 701/300; 340/995.1

(58) Field of Classification Search .......... 701/204, 701/210, 211, 300, 117, 119; 340/903, 988, 340/539.13; 455/456.3, 414; 705/1, 8
See application file for complete search history.

(56) References Cited

U.S. PATENT DOCUMENTS

| | | | |
|---|---|---|---|
| 6,424,910 B1* | 7/2002 | Ohler et al. | 701/202 |
| 7,058,507 B2* | 6/2006 | Saiki | 701/207 |
| 7,382,274 B1* | 6/2008 | Kermani et al. | 340/901 |
| 7,831,917 B1* | 11/2010 | Karam | 715/753 |
| 2003/0027558 A1* | 2/2003 | Eisinger | 455/414 |
| 2004/0039579 A1* | 2/2004 | Chithambaram et al. | 705/1 |
| 2005/0283308 A1* | 12/2005 | Szabo et al. | 701/207 |
| 2009/0138460 A1* | 5/2009 | Gorti et al. | 707/5 |

* cited by examiner

Primary Examiner — Tan Q Nguyen
(74) Attorney, Agent, or Firm — James A. Italia; Italia IP

(57) ABSTRACT

A system for monitoring progress of at least two parties who have agreed to meet at a predetermined destination substantially at the same time. The system tracks location of each party and estimates remaining time or distance or both of each party to the destination. Querying of each party as to location may be adjusted as to frequency of polling for example based on changing progress towards the destination. Location or remaining time or distance to the destination may be communicated to each of the parties. The system may establish a new predetermined destination based on updated progress of the parties.

18 Claims, 3 Drawing Sheets

ARRIVAL MONITORING WITH DIRECT AND ACTUAL TRAVEL PATH REPORTING

CROSS-REFERENCE TO RELATED APPLICATIONS

This application is related to Serial Number entitled "OPTIMIZING SELECTION OF METHOD OF DETERMINING LOCATION IN A SOCIAL NETWORKING SYSTEM USING MOBILE COMMUNICATIONS", filed May 8, 2009 as application Ser. No. 12/437,875.

FIELD OF THE INVENTION

The present invention pertains to a system for tracking location of diverse parties as they approach a common destination, and more particularly to a system for managing aspects of the system.

BACKGROUND OF THE INVENTION

Location management systems and social networking systems frequently incorporate a location determination feature. Suggested meetings may for example be dependent upon determining proximity or location of the parties. Location may be determined for example by using the Global Positioning System of satellites (GPS) or by relying upon personal data processing and communications devices, such as cellular telephones, and more specifically, triangulation using cellular telephones.

Each of these modes of location determination has certain limitations. In the case of GPS, successful operation depends upon a mobile communications device being fitted with GPS capability. Also, successful use of GPS depends upon line-of-sight communication with the satellites. Entering a building, tunnel, or other structure, and in some cases, being covered by a tree canopy or the like may interfere with GPS operation. GPS systems may require more time to deliver results, and may objectionably deplete the battery of a mobile telephone or the like.

Cellular telephone triangulation may fail to give accuracy of GPS systems. In crowded places, it may be desirable to offer greater accuracy than is available from cellular telephone triangulation systems.

Therefore, the most desirable method of tracking location of a participant in a social group may change with circumstances. Any one method of determining location may be unsuitable in any particular situation.

SUMMARY OF THE INVENTION

The present invention addresses the above deficiency in location monitoring systems and social networking systems by providing alternative location determination methods, and by establishing a hierarchy of desirability in such systems. Notably, the present system utilizes at least one of GPS and assisted GPS (hereinafter referred to as aGPS), and cellular telephone triangulation. All three of these modes of determining location may be called into play, including a hybrid of GPS and aGPS. Results may be entered into the system in as close to real time conditions as feasible.

The method of selection of mode of location monitoring may then be employed to conserve resources of the devices used in the system, such as cellular telephone batteries.

In an exemplary application of the invention, the first party to arrive at a predetermined common destination may monitor the progress of others, so as to better plan his or her time while waiting. Because the system reports both straight line distances and actual or map route distances of the remaining parties, it becomes possible to estimate arrival times and plan usage of waiting time accordingly. Because the system both monitors remaining time until arrival yet also monitors actual location, it is further possible to suggest a temporary rendezvous with one or more of the parties, since the party monitoring the others is aware of actual distance and travel time to the contemplated rendezvous.

BRIEF DESCRIPTION OF THE DRAWINGS

Similar reference characters denote corresponding features consistently throughout the attached drawings.

DETAILED DESCRIPTION

The present invention establishes a system and method for tracking progress of at least two parties who have agreed to meet at substantially the same time at a predetermined destination. More specifically, the method utilizes a portable location reporting device, such as a mobile telephone, to track location of each one of the parties. Location data is processed to enable estimation of time or distance or both remaining until each one of the parties arrives at the destination. The system can dynamically report progress of each party towards the destination and if desired change the predetermined destination to another location responsive to progress of the various parties.

Figure 1:
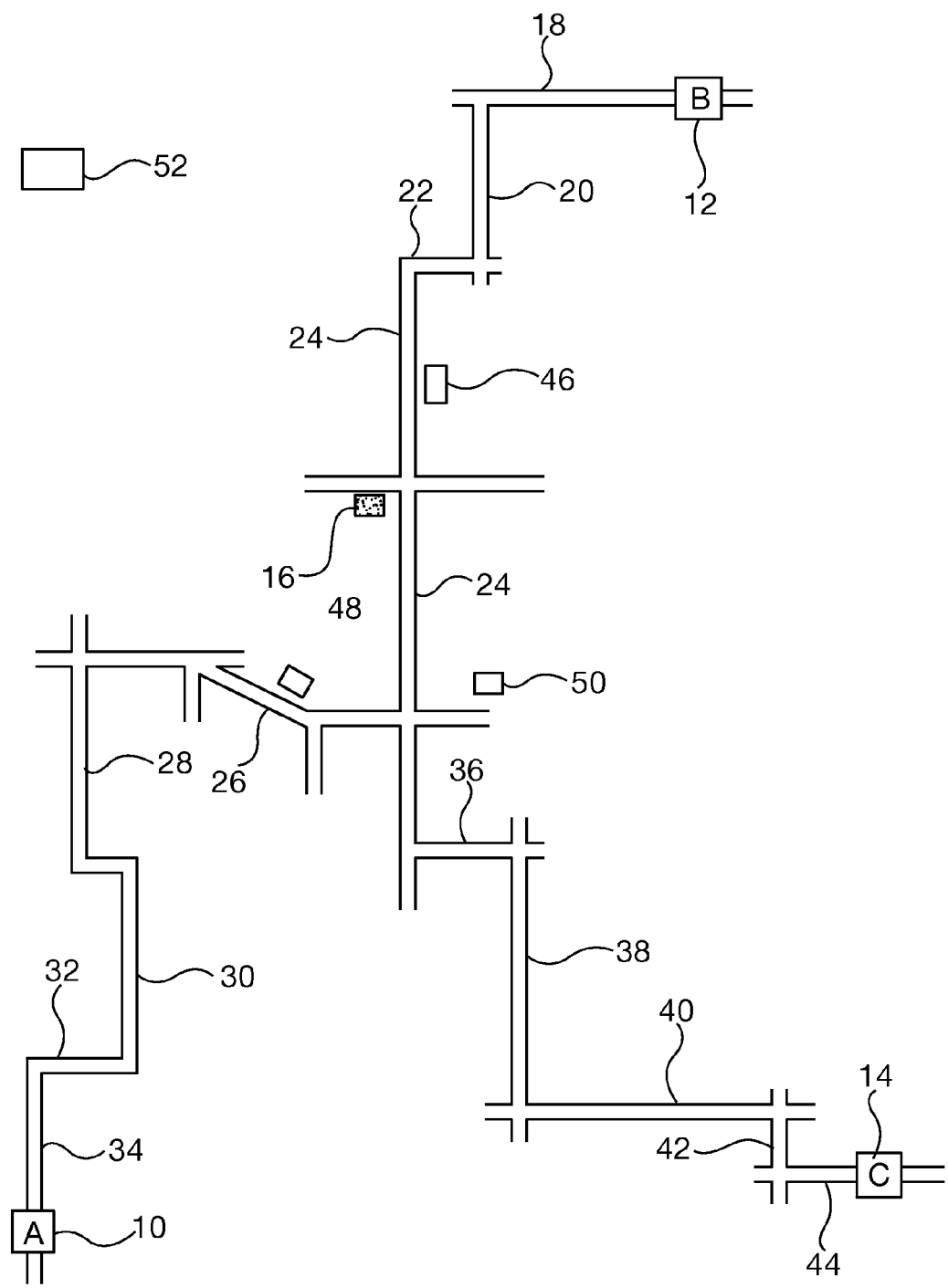
FIG. 1 is a diagrammatic representation of a partial map showing parties engaged in moving to a predetermined destination.

In a hypothetical implementation of the novel system, and referring to FIG. 1, three parties A, B, C may each be driving in respective automobiles 10, 12, 14 towards a pre-arranged meeting place or common destination 16. The automobiles 10, 12, 14 are shown on a partial map which has been abbreviated to reflect only those streets or roads which must be negotiated by each of the parties A, B, C to arrive at the common destination 16. Each of the parties A, B, C has been provided with a portable location reporting device such as a mobile telephone (not shown) which is GPS enabled or which is otherwise capable of location determination in any suitable way, such as triangulation of signals. The location reporting device of each of the parties A, B, C, has capability receiving location information from the other portable location reporting devices of the other parties and of transmitting location information to the other portable location reporting devices of the other parties. The communications capabilities necessary for this are inherent in devices such as mobile telephones and the like. These devices may be modified as necessary to accomplish the functions described herein, such as having appropriate software. Alternatively, they may work in conjunction with external systems such as a personal computer or a server to which they may be connected by dedicated communications channels or public communications channels such as the internet. An exemplary remote station which may have data processing apparatus and capabilities is indicated at 52.

Figure 2A:
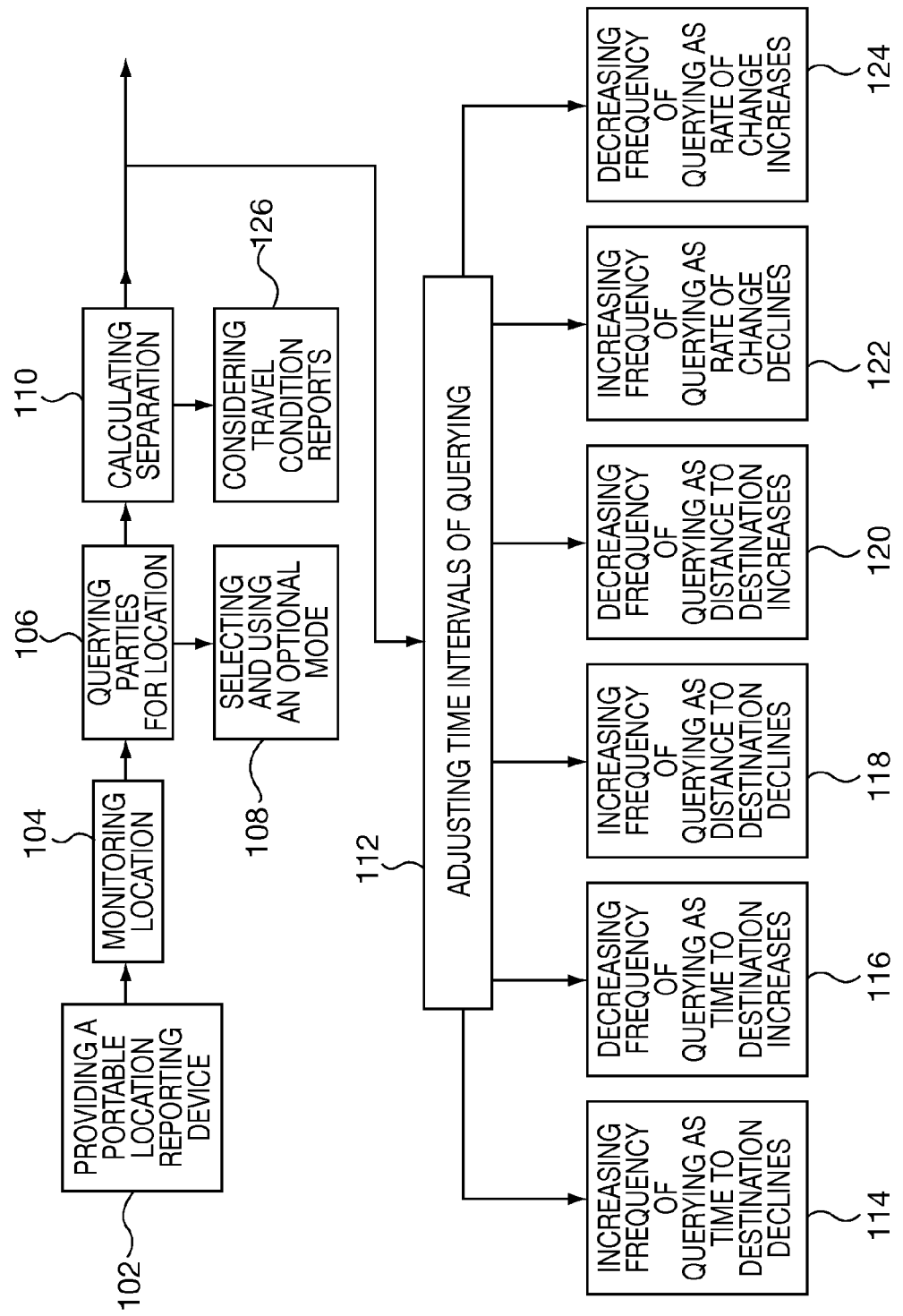
FIG. 2A is a part of a block diagram of a method of tracking progress of parties such as those depicted in FIG. 1, as the parties progress towards the predetermined destination.
Figure 2B:
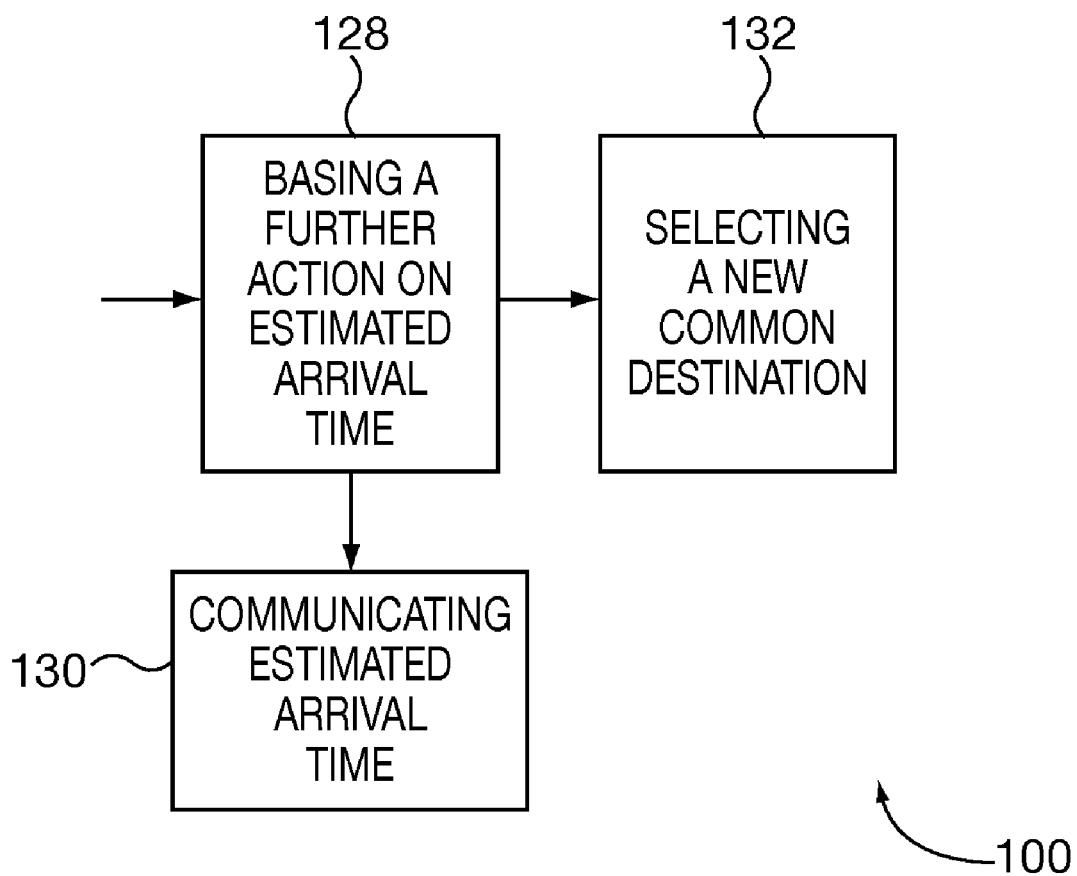
FIG. 2B is a continuation of the block diagram of FIG. 2A.

The present invention is a system which utilizes the above apparatus to track progress of the parties. According to one aspect of the invention, the invention may be regarded as a method 100 (with steps of the method 100 summarized in FIGS. 2A and 2B, reference to which is now made) of monitoring progress of the parties. Referring first to FIG. 2A, the method 100 may comprise a step 102 of providing each party with a portable location reporting device having a location capability wherein the portable location reporting device is capable of determining location. The portable location reporting device may be able to operate in at least two ways. For example, a first way may rely on the Global Positioning System (GPS), including assisted GPS. A second way may utilize triangulation of signals, as performed for example by cellular telephone systems. The portable location reporting device is of course capable not only of receiving location information from the other portable location reporting devices, but also of transmitting location information to the other portable location reporting devices being used in the system.

The method 100 may comprise a step 104 of monitoring location of at least one of the other parties using one of the portable location reporting devices. Of course, all of the parties, such as the parties A, B, and C may be monitored.

The method 100 may comprise a step 106 of determining a direct separation of each one of the monitored parties. Direct separation, as employed herein, is based on calculating either of time and distance remaining before arrival of any one of the monitored parties, based on the shortest travel path to the predetermined common destination. It should be mentioned that the shortest travel path may be regarded by the system as a straight line which may in actuality not be achievable. For example, parties traveling in automobiles along roads such as the roads 18, 20, 22, 24, 26, 28, 30, 32, 34, 36, 38, 40, 42, and 44 will likely be constrained to follow the roads 18 . . . 44 and not drive in a straight line towards the destination 16.

Distance may be calculated either by straight line determination, or alternatively by considering an optimum realistic or actual path. GPS systems provided for assisting drivers in automobiles provide an example of setting forth optimum realistic paths.

Time calculations may be similar or may operate in any other known way. These ways include extrapolating from progress to each current geographic point of the parties, or may be expanded to receive inputs that would change extrapolation based calculations, such as traffic and weather reports. Any predictive algorithm or other method of estimating time of arrival may be employed.

Calculations may be updated periodically by querying each one of the parties as to location. Of course, querying the parties is a semantic convenience in describing a function which is carried out automatically without active participation by the people involved. For example, querying may be accomplished by computerized functions which utilize the portable location reporting devices used by the parties. The method 100 may include the step 106 of querying the location of each one of the monitored parties at time intervals.

As it is possible to utilize several ways of determining location, the system may select an optimal mode of querying the location by considering the several ways and applying criteria to establish an optimal mode. The optimal mode decision may be based on accuracy of each of the several ways, or may be based on a secondary consideration such as demands made on the portable location reporting devices. For example, should the system rely heavily upon cellular telephones, it may be deemed preferable to select a way which minimizes depletion of batteries of the portable location reporting devices. The method 100 may comprise a step 108 of selecting and using that mode of querying determined to be optimal.

It will be appreciated that precision of determining proximity of any given party to the destination, such as the parties A, B, and C, and the destination 16, becomes of greater desirability as the parties approach the destination. Updating location data and estimated time or distance to arrival for each party may accordingly be performed at greater frequency over time. Accordingly, the method 100 may comprise a step 110 of calculating magnitude of separation for each one of the monitored parties from the destination, where separation may be regarded as time or as distance. The step 110 may produce an output which may be the remaining time or remaining distance to the destination, or alternatively, may be an estimated time of arrival, or a combination of these. A further step 112 may be that of adjusting the time intervals at which the location of each one of the monitored parties is queried based on calculated magnitudes of separation of the monitored parties.

Adjustment of frequency of querying has several possibilities. For example, frequency may be increased as the time or distance to estimated arrival at the destination decreases. Alternatively stated, time intervals between queries may be reduced as the estimated time until arrival decreases. The converse is also possible. That is, the system may decrease frequency of querying, or may increase time intervals between queries as the estimated time until arrival increases. Similar treatment may be given to calculations based on distances. That is, frequency of querying may be increased, or time intervals between queries may be reduced, as the estimated distance to the predetermined common destination decreases. Once again, the converse is possible in that time intervals between queries may be increased as the estimated distance to the predetermined common destination increases. It would be possible for a party to become lost or perhaps to deviate intentionally from the path to the destination, for example, to perform a task en route.

Accordingly, the method 100 may comprise a step 114 of reducing time intervals between queries as the estimated time until arrival decreases, or alternatively, a step 116 of increasing time intervals between queries as the estimated time until arrival increases.

As the same holds true for defining separation in terms of distance, the method 100 may comprise a step 118 of reducing time intervals between queries as the estimated distance to the predetermined common destination decreases, or alternatively, a step 120 of increasing time intervals between queries as the estimate distance to the predetermined common destination increases.

The frequency of querying may be based not only on absolute values of time and distance, but also on rate of change of location of any one or more parties over time. Therefore, the method 100 may comprise a step 122 of increasing time intervals between queries as the rate of change of location of a monitored party decreases, or alternatively, a step 124 of decreasing time intervals between queries as the rate of change of location of a monitored party increases.

Calculations of separation directed to time estimates may factor in potential delays due to traffic volume, weather conditions, and the like. Therefore, the step 110 100 may comprise a step 126 of considering travel condition reports when determining the estimated time of separation.

Thus far there has been detailed a method 100 which calculates separation, or time or distance until arrival of at least one party or of plural parties, such as the parties A, B, and C to a destination such as the destination 16. Exemplary ways of using calculated separation will be described, with reference to FIG. 2B.

After the step 110 of calculating separation, as shown in FIG. 2A, a further action may be based on estimated arrival time (this is shown as a step 128 of basing a further action on the estimated arrival time). Of course, remaining distance of separation could be used in place of estimated arrival time if desired.

The step 128 may comprise a further step 130 of communicating estimated arrival time to the destination to one or more of the parties, such as the parties A, B, and C. Each of the parties may then modify his or her travel accordingly.

The step 128 may also comprise a further step 132 of selecting a new common destination based on the progress of each party, such that each party with arrive at said new common destination at substantially the same time. This may come into play for example where one or more of the parties is delayed, or where one or more of the parties makes unexpected progress. For example, one of the parties may cancel a planned activity and thus significantly reduce the amount of time to arrival at the original destination, such as the destination 16.

In specific examples, and referring again to FIG. 1, should the party B be delayed, or fail to make expected progress, the system may be called on to establish a new destination at which the parties A, B, and C will meet, such as a new destination 46. It will be noted that the destination 46 is closer to the original location of the party B, so that estimated or calculated travel time to the new destination 46 for each of the parties may be rendered equal to assure simultaneous arrival of the parties.

In another example, should the party B make unexpected progress, such as by canceling a planned activity, then a new destination such as one of the new destinations 48, 50 may be selected. Again, this may render equal travel time for the three parties A, B, C.

A new or subsequently selected common destination, such as any of the new destinations 46, 48, 50 may also be selected based on progress of each one of the parties. For example, should the party B make unexpected progress while the party A is unexpectedly delayed, then the new or subsequently selected destination may be the destination 48 rather than the destination 50 or some other destination (not shown).

The decision to take further action, such as in the step 132 of selecting a new common destination could be predicated on distance rather than by time. For example, direct separation may be calculated for either time or distance remaining before arrival of one of the monitored parties based on the shortest travel path to the predetermined common destination, whether this be the original destination, such as the destination 16, or a subsequently selected destination, such as any of the destinations 46, 48, and 50.

The method 100 may be implemented as an ongoing process, with repeating iteration of any one step or of plural steps. For example, the steps 106 (querying parties for location) and 110 (calculating separation) may be performed repeatedly to constantly update progress of the parties towards the selected destination. Changing calculated separation or estimated time of arrival may result in repeated steps 132 (selecting a new destination).

Any of the steps may be included or omitted based on the need. Steps may be practiced out of the order as presented herein if desired. Additional further actions (not specified) may be practiced to exploit calculation of remaining time or distance of the various parties to the original destination or to an alternative destination.

While the present has been described in connection with what is considered the most practical and preferred embodiments, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A method of managing progress of at least two parties engaged in converging upon a predetermined common destination at substantially the same time, comprising the steps of:
    providing each party with a portable location reporting device having a location capability wherein the portable location reporting device is capable of determining location, and a communication capability wherein the portable location reporting device is capable of receiving location information from the other portable location reporting devices and of transmitting location information to the other portable location reporting devices;
    monitoring location of at least two of the parties by querying each one of the monitored parties using one of the portable location reporting devices;
    estimating arrival time of the parties who were monitored; and
    determining a common destination which will be reached at substantially the same time by all of the parties, based on estimated arrival times of the parties;
    calculating magnitude of separation for each one of the monitored parties;
    adjusting the time intervals at which the location of each one of the monitored parties is queried based on calculated magnitudes of separation of the monitored parties; and
    reducing time intervals between queries as the estimated time until arrival decreases.

2. The method of claim 1, wherein the portable location reporting device is capable of determining location in at least two ways comprising a first way and a second way, and said method includes the further steps of
    determining an optimal mode of querying the location according to the at least two ways of determining locations, and
    selecting and using that mode of querying determined to be optimal.

3. The method of claim 1, further comprising the steps of:
    calculating magnitude of separation for each one of the monitored parties;
    adjusting the time intervals at which the location of each one of the monitored parties is queried based on calculated magnitudes of separation of the monitored parties; and
    increasing time intervals between queries as the estimated time until arrival increases.

4. The method of claim 1, further comprising the steps of:
    calculating magnitude of separation for each one of the monitored parties;
    adjusting the time intervals at which the location of each one of the monitored parties is queried based on calculated magnitudes of separation of the monitored parties; and
    reducing time intervals between queries as the estimated distance to the predetermined common destination decreases.

5. The method of claim 1, further comprising the steps of:
    calculating magnitude of separation for each one of the monitored parties;

adjusting the time intervals at which the location of each one of the monitored parties is queried based on calculated magnitudes of separation of the monitored parties; and increasing time intervals between queries as the estimated distance to the predetermined common destination increases.

6. The method of claim 1, comprising the further steps of:
calculating the rate of change of location of each one of the monitored parties;
adjusting the time intervals at which the location of each one of the monitored parties is queried based on calculated rate of change of location of each one of the monitored parties; and
increasing time intervals between queries as the rate of change of location of a monitored party decreases.

7. The method of claim 1, comprising the further steps of:
calculating the rate of change of location of each one of the monitored parties;
adjusting the time intervals at which the location of each one of the monitored parties is queried based on calculated rate of change of location of each one of the monitored parties; and
decreasing time intervals between queries as the rate of change of location of a monitored party increases.

8. The method of claim 1, comprising the further step of communicating estimated arrival time of at least one of the parties to at least one other of the parties.

9. The method of claim 1, comprising the further step of considering travel conditions when calculating separation in terms of time.

10. A method of managing progress of at least two parties engaged in converging upon a predetermined common destination at substantially the same time, comprising the steps of:
providing each party with a portable location reporting device having a location capability wherein the portable location reporting device is capable of determining the location of each party, and a communication capability wherein the portable location reporting device is capable of receiving location information from the other portable location reporting devices and of transmitting location information to the other portable location reporting devices;
estimating arrival time of the parties;
determining common destination which will be reached at substantially the same time by all of the parties, based on estimated arrival times of the parties
updating estimated arrival time of the parties; and
determining a new destination at which each party will arrive at substantially the same time utilizing updated estimated arrival times of the parties;
adjusting the time intervals of querying progress of said parties toward said common destination; and
of reducing time intervals between queries as the estimated time until arrival decreases.

11. The method of claim 10, comprising the further step of communicating the updated estimated arrival time to at least one of the two parties.

12. The method of claim 10, further comprising the steps of:
adjusting the time intervals of querying progress of said parties toward said common destination; and
increasing time intervals between queries as the estimated time until arrival increases.

13. The method of claim 10, further comprising the steps of:
adjusting the time intervals of querying progress of said parties toward said common destination; and
reducing time intervals between queries as the estimated distance to the predetermined common destination decreases.

14. The method of claim 10, further comprising the steps of:
adjusting the time intervals of querying progress of said parties toward said common destination; and
increasing time intervals between queries as the estimated distance to the predetermined common destination increases.

15. The method of claim 10, further comprising the steps of:
calculating the rate of change of location of each one of the monitored parties;
adjusting the time intervals of querying progress of said parties toward said common destination; and
increasing time intervals between queries as the rate of change of location of a monitored party decreases.

16. The method of claim 10, further comprising the steps of:
calculating the rate of change of location of each one of the monitored parties;
adjusting the time intervals of querying progress of said parties toward said common destination; and
decreasing time intervals between queries as the rate of change of location of a monitored party increases.

17. The method of claim 10, further comprising the step of determining a direct separation of each one of the monitored parties, wherein the direct separation is a calculation of at least one of time and distance remaining before arrival of one of the monitored parties based on the shortest travel path to the predetermined common destination.

18. The method of claim 10, comprising the further step of considering travel conditions when calculating separation in terms of time.

* * * * *